(12) United States Patent
Iwazumi et al.

(10) Patent No.: US 7,397,348 B2
(45) Date of Patent: Jul. 8, 2008

(54) DATA COMMUNICATION APPARATUS WITH INTERMITTENT ACTIVATION CONTROL CIRCUIT

(75) Inventors: Keiichi Iwazumi, Yamagata (JP); Tomotake Ooba, Yamagata (JP); Fujio Higuchi, Yamagata (JP); Yoichi Takahashi, Yamagata (JP); Akira Saitou, Yamagata (JP); Keiko Kobayashi, Yamagata (JP)

(73) Assignee: NEC Electronics Corporation, Kanagawa (JP)

( * ) Notice: Subject to any disclaimer, the term of this patent is extended or adjusted under 35 U.S.C. 154(b) by 217 days.

(21) Appl. No.: 11/242,046

(22) Filed: Oct. 4, 2005

(65) Prior Publication Data

US 2006/0071768 A1    Apr. 6, 2006

(30) Foreign Application Priority Data

Oct. 5, 2004    (JP) .............................. 2004-293124

(51) Int. Cl.
    *B60R 25/10* (2006.01)
(52) U.S. Cl. .................. 340/426.33; 340/442; 340/445; 340/447

(58) Field of Classification Search .................. 340/442, 340/445, 447, 426.33; 73/146, 146.5
See application file for complete search history.

(56) References Cited

U.S. PATENT DOCUMENTS 6,744,357 B2 *    6/2004    Itou et al. .................... 340/445

FOREIGN PATENT DOCUMENTS

| JP | 5-183487 A | 7/1993 |
|---|---|---|
| JP | 8-194022 A | 7/1996 |
| JP | 9-113654 A | 5/1997 |
| JP | 2001-0237985 A | 8/2001 |
| JP | 2003-16565 A | 1/2003 |
| JP | 2003-208685 A | 7/2003 |
| JP | 2003-220809 A | 8/2003 |
| JP | 2004-234622 A | 8/2004 |

* cited by examiner

*Primary Examiner*—Daryl C Pope
(74) *Attorney, Agent, or Firm*—Sughrue Mion, PLLC

(57) ABSTRACT

A data communication device includes a receiving circuit configured to receive a data signal in an active state. An intermittent activation control circuit activates the receiving circuit into the active state in a predetermined time interval. A control unit operates in response to the data signal received by the receiving circuit. Also, the control unit controls the time interval of the intermittent activation control circuit.

17 Claims, 5 Drawing Sheets

Fig. 5A
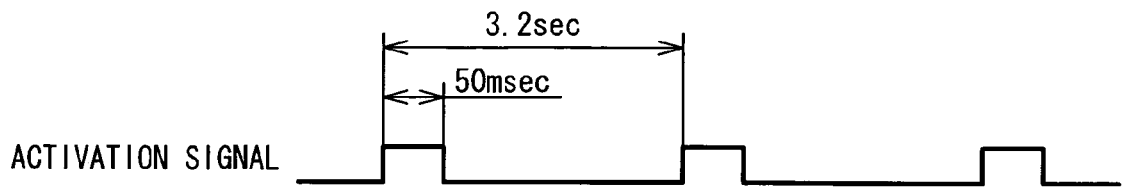
ACTIVATION SIGNAL
Fig. 5B
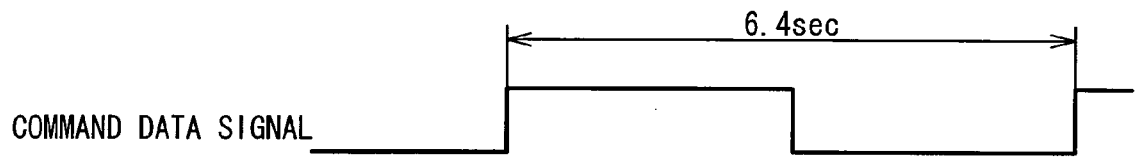
COMMAND DATA SIGNAL
Fig. 6
| INTERMITTENT CLOCK PERIOD | RECEPTION MEAN CURRENT (/hr) |
|---|---|
| 0.8S | 4 μA/16=250nA |
| 1.6S | 4 μA/32=125nA |
| 3.2S | 4 μA/64=63nA |
| ⋮ | ⋮ |
| 204.8S | 4 μA/256=16nA |

DATA COMMUNICATION APPARATUS WITH INTERMITTENT ACTIVATION CONTROL CIRCUIT

BACKGROUND OF THE INVENTION

1. Field of the Invention

The present invention relates to a data communication system and a data communication method, and, in particular, to a data communication system for an intermittent activation control circuit and a data communication method in the same.

2. Description of the Related Art

In recent years, safety-related regulations have been tightened in Japan and US. According to the TREAD Act (Transportation Recall Enhancement, Accountability and Document Act) that will come in effect in North America, a tire pneumatic pressure monitoring system should be installed to new cars to be on the market in 2006 and afterward. On that account, studies are currently being performed on a technique of attaching a sensor inside a tire and measuring a pneumatic pressure and temperature of the tire. In the technique, a sensor unit is installed in a valve portion of each of four tires to monitor all the four tires independently. This technique offers advantages in that it is possible to monitor the tire pneumatic pressure in a high precision even while the car is stopped or parked.

As a pneumatic pressure monitoring system, a system is known in which a tire pneumatic pressure is measured in a specific time interval, data on the tire pneumatic pressure is sent to a car body by radio wave, and the data is displayed on a display unit provided to a front panel of the car. This system is provided with a transmitting module installed inside the tire wheel and a receiving module attached to the car body. The transmitting module is provided with several kinds of sensors for detecting a pneumatic pressure, temperature, etc., a receiving section for receiving a command data sent from the receiving module by LF (Low Frequency) wave, and a transmitting section for transmitting data obtained by the sensors to the receiving module by RF (Radio Frequency) wave. Electric power consumed in the transmitting module is all supplied from a battery connected to the transmitting module.

As mentioned above, the transmitting module is attached inside the tire wheel mainly carries out tire pneumatic pressure measurement, signal processing, radio transmission, etc. Thus, the transmitting module is required to be compact and lightweight so as not to affect tire balance. For this purpose, it is practical with respect to a cost that the battery used for the module is a button battery or the like. Also, the battery must be connected to the transmitting module in such a manner as not to be easily disconnected due to vibration on driving. Generally, the battery is not replaced until the tire is discarded.

Under these use conditions, it is desired to utilize the transmitting module efficiently in minimum power consumption.

In conjunction with the above description, a "device for detecting tire mounting position" is disclosed in Japanese Laid Open Patent Application (JP-P2003-220809A). In this conventional example, a tire pneumatic pressure detecting section is installed inside each tire to detect a pneumatic pressure of each of tires. A transmission section is installed inside each tire together with the tire pneumatic pressure detection section, and transmits tire pneumatic pressure data detected by the tire pneumatic pressure detection section together with a tire identifier. Receiving sections are installed in the vehicle body in proximity to the tires to receive the tire identifier and the tire pneumatic pressure data transmitted by the transmission section. The transmission section has a wake mode in which a signal is transmitted to the receiving section and a sleep mode in which no signal is transmitted. The receiving section, at a time of the driving of the vehicle, issues a wake-up signal to the transmission section installed in the tire closest to the installation position of the receiving section to switch the transmission section from the sleep mode to the wake mode. Then, the receiving section receives the tire pneumatic pressure data and the tire identifier returned from the transmission section, and confirms the tire mounting position based on the tire pneumatic pressure data and the tire identifier.

In the above-mentioned conventional example, when the transmission section is in the sleep mode, the receiving section cancels the sleep mode by transmitting a wake-up signal to the transmission section. Accordingly, a part of the transmission section must keep its active state so as to be always able to receive the wake-up signal from the receiving section. Thus, a current is consumed all the times. As a result, the lifetime of a battery becomes short in the above-mentioned system in which it is difficult to replace the battery. As a result, a problem is caused that a predetermined operation time, e.g., ten years is not satisfied. In addition, a cost increases if a large-sized battery is used to secure the predetermined operation time.

SUMMARY OF THE INVENTION

In an aspect of the present invention, a data communication device includes a receiving circuit configured to receive a data signal in an active state; an intermittent activation control circuit configured to activate the receiving circuit into the active state in a predetermined time interval; and a control unit configured to operate in response to the data signal received by the receiving circuit.

The control unit controls the time interval of the intermittent activation control circuit. In this case, the control unit may control the time interval of the intermittent activation control circuit based on a command of the data signal received by the receiving circuit. Also, the command is determined based on a time length of a next one of the data signal.

Also, the receiving circuit may be set to the active state in response to an activation signal. The intermittent activation control circuit may include an oscillator configured to generate an oscillation signal; a frequency divider configured to frequency-divide the oscillation signal; and a timer configured to output the oscillation signal after the frequency-division as the activation signal to the receiving circuit in the time interval based on a time interval data.

In this case, the frequency divider may have a plurality of frequency division ratios. The intermittent activation control circuit may further include a switch provided between the frequency divider and the timer to select one of the plurality of frequency division ratios based on the time interval data.

In another aspect of the present invention, a communication control module provided for a target, includes first and second antennas; a receiving circuit configured to receive a command data signal through the first antenna in an active state; an intermittent activation control circuit configured to activate the receiving circuit into the active state in a predetermined time interval; a sensor section including at least a sensor for the target; a transmission interface configured to transmit a measurement data signal through the second antenna; and a control unit configured to control the sensor section and the transmission interface such that the measurement data signal from the sensor section is transmitted, when the command data signal received by the receiving circuit includes a measurement command.

Here, the control unit may control the time interval of the intermittent activation control circuit based on the command data signal received by the receiving circuit, when the command data signal received by the receiving circuit includes an interval setting command.

Also, the command is determined based on a time length of a next one of the data signal. Also, when the receiving circuit is set to the active state in response to an activation signal, the intermittent activation control circuit may include an oscillator configured to generate an oscillation signal; a frequency divider configured to frequency-divide the oscillation signal; and a timer configured to output the oscillation signal after the frequency-division as the activation signal to the receiving circuit in the time interval based on a time interval data outputted from the control circuit in response to the command data signal.

In this case, when the frequency divider has a plurality of frequency division ratios, the intermittent activation control circuit may further include a switch provided between the frequency divider and the timer to select one of the plurality of frequency division ratios based on the time interval data.

Also, a duration time of the command data signal may be equal to or longer than the time interval.

In another aspect of the present invention, a TPMS (tire pneumatic pressure monitoring system) includes a plurality of sensor communication modules provided for tires, each of plurality of sensor communication modules having first and second antennas; a plurality of sensor initiators provided or the tires, each of the plurality of sensor initiators having third and fourth antennas; and a communication control module provided for a car body, and connected with the third and fourth antennas through a LAN. The communication control module transmits an electromagnetic wave of a command data signal through the third antenna to each of the plurality of sensor communication modules. Each of the plurality of sensor communication modules intermittently receives the command data signal through the first antenna, and transmits a measurement data signal of at least one of a tire pneumatic pressure and a tire temperature to the communication control module from the second antenna through the fourth antenna when the command data signal includes a measurement command.

Here, each of the plurality of sensor communication modules may include a receiving circuit configured to receive the command data signal through the first antenna in an active state; an intermittent activation control circuit configured to activate the receiving circuit into the active state in a predetermined time interval; a sensor section including at least one of a sensor for the tire pneumatic pressure and a sensor for the tire temperature; a transmission interface configured to transmit the measurement data signal obtained from the sensor section through the second antenna; and a control unit configured to control the sensor section and the transmission interface such that the measurement data signal from the sensor section is transmitted, when the command data signal received by the receiving circuit includes the measurement command.

In this case, the control unit may control the time interval of the intermittent activation control circuit based on the command data signal received by the receiving circuit, when the command data signal includes an interval setting command. Also, the command is desirably determined based on a time length of a next one of the data signal.

In another aspect of the present invention, an operation method in a TPMS (tire pneumatic pressure monitoring system), is achieved by transmitting a communication control module an electromagnetic wave of a command data signal through a first antenna to each of a plurality of sensor communication modules provided for tires; by intermittently receiving the command data signal through a second antenna provided for each of the plurality of sensor communication modules; and by transmitting a measurement data signal of at least one of a tire pneumatic pressure and a tire temperature to the communication control module from a third antenna through a fourth antenna when the command data signal includes a measurement command.

Here, the intermittently receiving may be achieved by intermittently activating a receiving circuit into an active state in a predetermined time interval; and by receiving the command data signal through the first antenna in the active state of the receiving circuit.

Also, the transmitting a measurement data signal may be achieved by sensing at least one of the tire pneumatic pressure and the tire temperature; and by transmitting the measurement data signal as a result of the sensing to the communication control module from the third antenna through the fourth antenna when the command data signal includes the measurement command.

Also, the operation method may be achieved by further controlling the time interval based on the command data signal received by the receiving circuit, when the command data signal includes an interval setting command.

BRIEF DESCRIPTION OF THE DRAWINGS

FIG. 5A is a timing chart of an activating signal outputted from the intermittent activation control circuit;

FIG. 5B is a timing chart of a command signal transmitted from a control communication module to the sensor communication module; and FIG. 6 is a diagram showing a relationship of a period of the activating signal and a reception mean current of an LF receiving circuit.

DESCRIPTION OF THE PREFERRED EMBODIMENTS

Hereinafter, a data communication system according the present invention will be described in detail with reference to the attached drawings.

Figure 1:
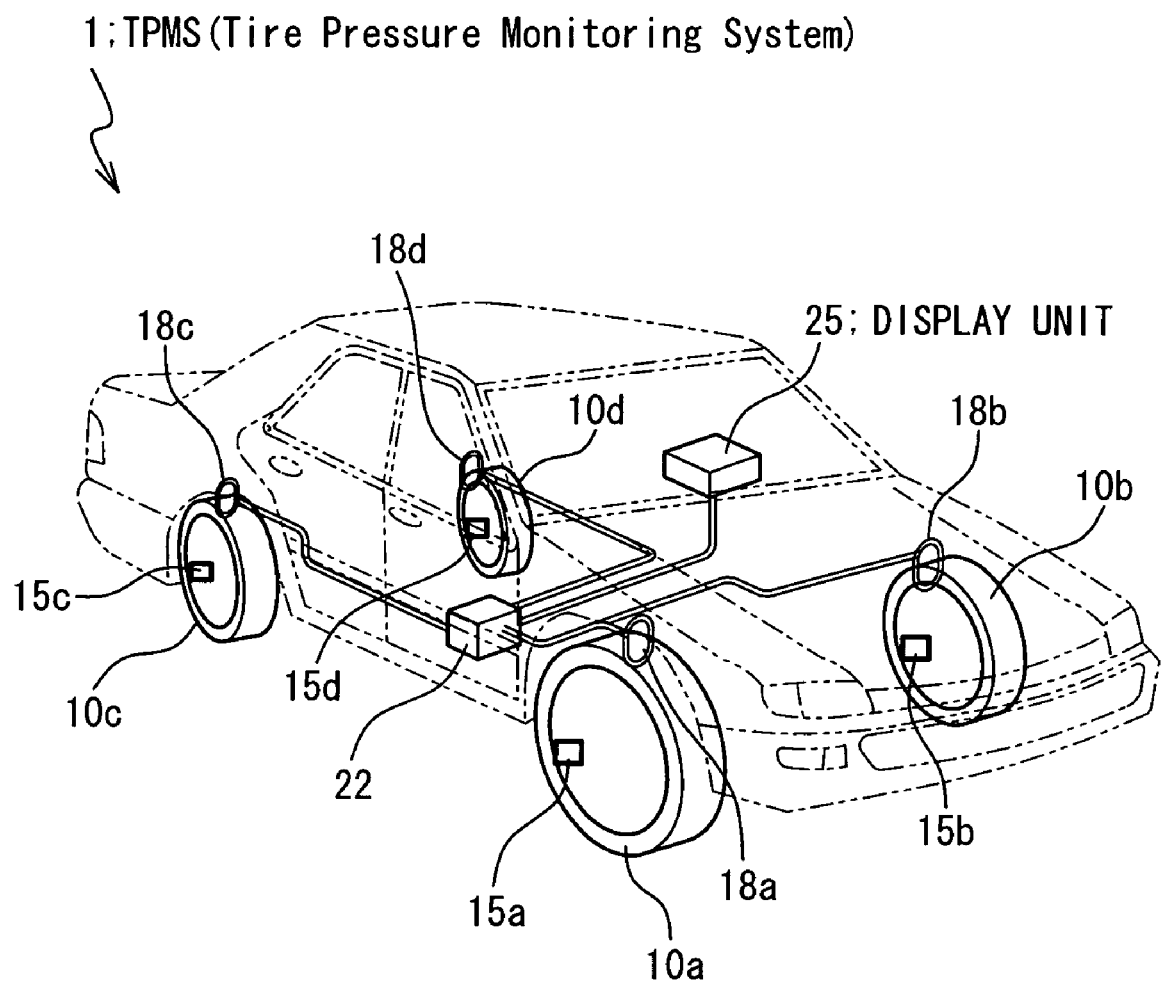
FIG. 1 is an outline view of the TPMS (Tire Pressure Monitoring System) according to an embodiment of the present invention.

FIG. 1 shows an outline structure of a TPMS (Tire Pressure Monitoring System) 1 according to an embodiment of the present invention. The TPMS 1 is provided with sensor communication modules 15 (15a to 15d) attached inside wheels of four tires 10 (10a to 10d), sensor initiators 18 (18a to 18d), a communication control module 22 installed on a car body, and a display unit 25. The communication control module 22, the sensor initiator 18, and the display unit 25 are connected by an in-car LAN. The sensor initiator 18 is provided with an LF (low frequency) antenna 23 and an RF (radio frequency)

antenna 24, which will be described later. The communication control module 22 has not only a function of receiving RF electromagnetic wave transmitted from a Key Less Entry unit, ext., and transmitting a command data signal to the sensor communication modules 15, but also a function of receiving data signals transmitted from the sensor communication modules 15. The command data signal indicates each of various commands. Each of the sensor communication modules 15 includes several kinds of sensors for detecting a tire pneumatic pressures, a tire temperatures, etc., receives the command data signal transmitted from the communication control module 22 through LF antenna 23 by LF (low frequency) electromagnetic wave, and transmits the data signals obtained from the sensors to the communication control module 22 through the RF antenna 24 by RF (radio frequency) electromagnetic wave.

When a driver gets into a car, RF electromagnetic wave for Key Less Entry is transmitted to the communication control module 22. Upon receiving the RF electromagnetic wave for Key Less Entry, the communication control module 22 transmits the command data signal to the sensor communication modules 15 through an in-car LAN and the LF antennas 23 of the sensor initiators 18 by LF electromagnetic wave (125 KHz) to notify start of the car. In response to the command data signal, the sensor communication modules 15 are activated such that the sensors measure pneumatic pressures and temperatures of the tires 10. Then, the measured data are outputted as the measurement data signals from the sensor communication modules 15 to the communication control module 22 through the RF antennas 24 of the sensor initiators 18 by the RF electromagnetic wave (433 MHz or 315 MHz). The communication control module 22 drives the display unit 25 to display the measurement data signals.

When the car starts running, motion switches (not shown) provided for the tires sense the running of the car. At this time, when the tire pneumatic pressure has reached a predetermined value, or in a specific time interval, the sensor communication modules 15 transmit the measurement data signals to the communication control module 22 by RF electromagnetic wave. Then, the communication control module 22 transmits the measurement data signals to the display unit 25 and a warning section (not shown). The display unit 25 and the warning section notify the pneumatic pressure and temperature etc of the tires to the driver.

Figure 2:
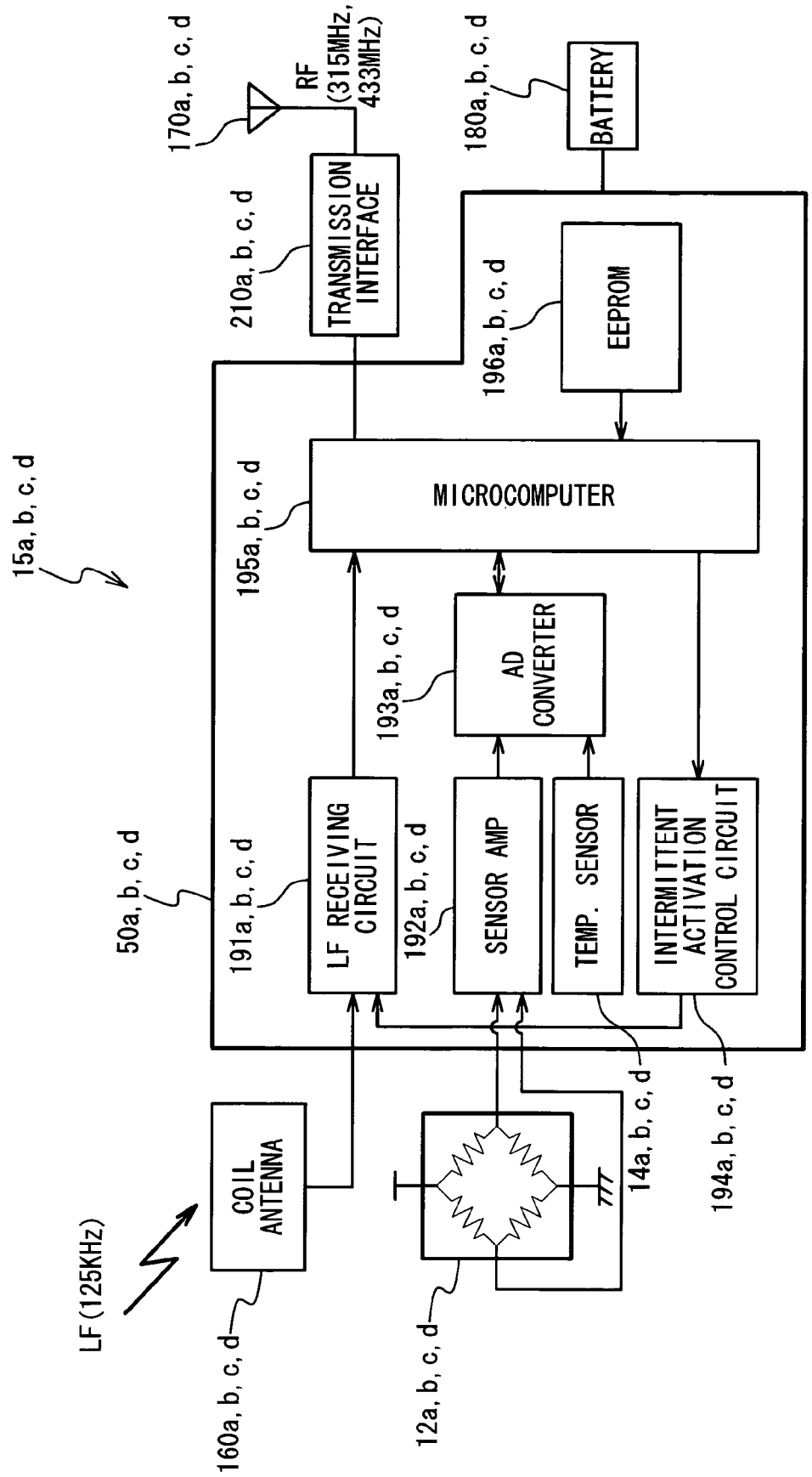
FIG. 2 is a block diagram showing an outline of the configuration of a sensor communication module in a data communication system according to the embodiment of the present invention.

The sensor communication modules 15 of the TPMS 1 according to this embodiment are basically provided for all the four tires 10, respectively. Each of the sensor communication modules 15 has a same configuration. FIG. 2 shows a block diagram of the sensor communication module 15. As shown in FIG. 2, the sensor communication module 15 is provided with a communication device 50 (50a to 50d), a coil antenna 160 (160a to 160d), the tire pneumatic pressure sensor 12 (12a to 12d), a transmission interface 210 (210a to 210d), an RF antenna 170 (170a to 170d), and a battery 180 (180a to 180d). The communication device 50 other than the coil antenna 160, the pneumatic pressure sensor 12, the transmission interface 210, the RF antenna 170 and the battery 180 are formed on a single chip.

The communication device 50 is provided an LF receiving circuit 191 (191a to 191d), a sensor amplifier (AMP) 192 (192a to 192d), the tire temperature sensor 14 (14a to 14d), an intermittent activation control circuit 194 (194a to 194d), an AD converter 193 (193a to 193d), a microcomputer 195 (195a to 195d), and an EEPROM 196 (196a to 196d).

The intermittent control circuit 194 intermittently transmits an activation signal to the LF receiving circuit 191 to activate the LF receiving circuit 191. The LF receiving circuit 191 receives the LF electromagnetic wave of a command data signal transmitted from the communication control module 22 through the coil antenna 160 in the active state and notifies the reception of the command data signal to the microcomputer 195. The microcomputer 195 carries out a process corresponding to a command of the command data signal. When the command indicates measurement by the sensors, the microcomputer 195 controls each section of the communication device 50 and the transmission interface 210. Thus, the sensor amplifier 192 amplifies an analog pneumatic pressure measurement data signal outputted from the tire pneumatic pressure sensor 12 to output to the AD converter 193. The AD converter 193 converts the analog pneumatic pressure measurement data signal and an analog temperature measurement data signal into digital measurement data signals. The EEPROM 196 stores identification (ID) data of the tire indicative of the tire position and various kinds of correction data. The microcomputer 195 transmits the digital measurement data signals to the communication control module 22 through the transmission interface 210 and the RF antenna 170 by the RF electromagnetic wave. The battery 180 supplies the electric power to the communication device 50 and the transmission interface 210.

Figure 3:
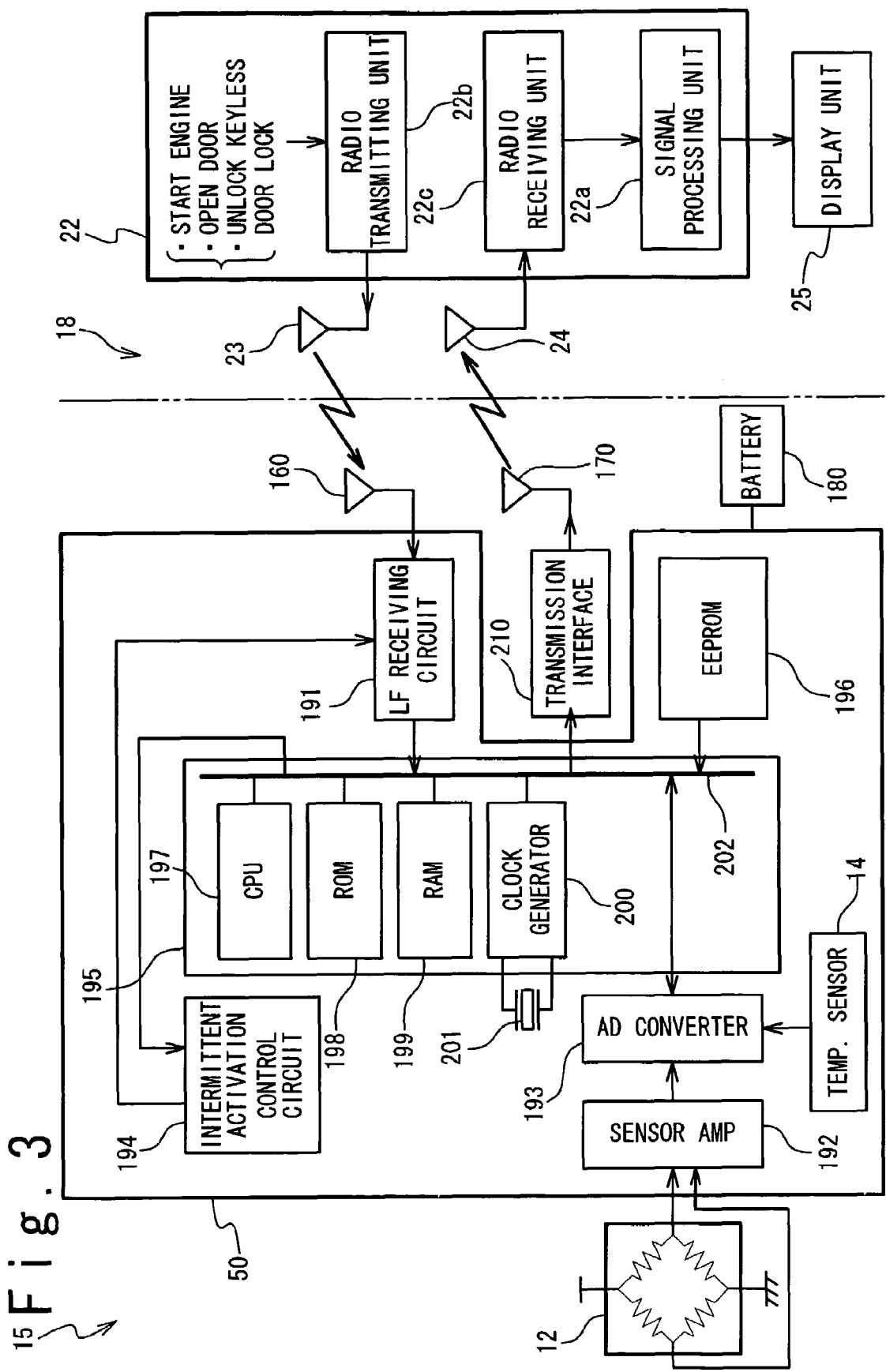
FIG. 3 is a block diagram showing an outline of the configuration of the data communication system according to the embodiment of the present invention.

FIG. 3 shows the whole configuration of the data communication system according to the embodiment of the present invention in detail. As shown in FIG. 3, the microcomputer 195 is provided with a CPU 197 (197a to 197d), a ROM 198 (198a to 198d), a RAM 199 (199a to 199d), and a clock generator 200 (200a to 200d). An oscillator 201 (201a to 201d) is provided outside of the microcomputer 195 to be connected to the clock generator 200. The CPU 197, the ROM 198, the RAM 199, and the clock generator 200 are connected with each other through a bus 202 (202a to 202d). Also, the communication control module 22 is provided with a radio transmission unit 22a, a radio reception unit 22c, and a signal processing unit 22a. The radio transmission unit 22b is connected with the LF transmission antenna 23, and the radio reception unit 22c is connected with the RF reception antenna 24. The communication control module 22 is connected with the display unit 25 through the in-car LAN.

The communication control module 22 receives RF electromagnetic wave for Key Less Entry. Also, it is notified to the communication control module 22 that the door is opened, or the engine is started. At this time, the communication control module 22 transmits from the radio transmission unit 22b to the sensor communication modules 15 through the LF transmission antennas 23 by the electromagnetic waves of a command data signal to instruct the measurement by the sensors. The LF electromagnetic waves of the command data signal are received by the LF receiving circuits 191 through the coil antennas 160 for the sensor communication modules 15, respectively.

The command data signal received by each LF receiving circuit 191 is sent to the microcomputer 195. In the microcomputer 195, The CPU 197 of the microcomputer 195 is switched from a stand-by mode to an active mode in response to the command data signal such that the CPU 197 is activated. When the microcomputer 195 is switched to the active mode, the crystal oscillator 201 provided for the microcomputer 195 starts oscillation. When the command indicates the measurement, various types of initial settings for data acquisition are carried out such as a damping resistance setting within a preamble period after the crystal oscillator 201 starts the oscillation. Thus, the CPU 197 starts a process corresponding to the command of the command data signal.

Then, the microcomputer 195 outputs a measurement start control signal to the temperature sensor 14 and the pneumatic pressure sensor 12 in response to the command data signal. An analog measurement data signal of the tire pneumatic pressure measured by the pneumatic sensor 12 is supplied to the AD converter 193 through the sensor amplifier 192 and an analog measurement data signal of the tire temperature measured by the temperature sensor 14 is supplied directly to the AD converter 193. The analog measurement data signals are converted into digital measurement data signals by the AD converter into and then supplied to the microcomputer 195. The CPU 197 corrects the digital measurement data signals by use of correction data stored in the EEPROM 196, and then transmitted to the communication control module 22 by RF electromagnetic wave through the transmission interface 210 and the RF antenna 170. The RF electromagnetic wave of measurement data signals is received by the RF receiving antenna 24, and then sent to the signal processing unit 22a through the radio receiving unit 22c. The measurement data signals are processed by the signal processing unit 22a, and the processing results are displayed on the display unit 25.

In the conventional transmission module, an activating circuit is always active. The activating circuit receives the LF electromagnetic wave of command data signal and sends an interrupt signal to the microcomputer. When the conventional transmission module has received the LF electromagnetic wave of command data signal, the microcomputer acquires data measured by the sensors. Electric power to be consumed by the conventional transmission module is all supplied from the battery connected to the conventional transmission module. However, in order to operate the conventional transmission module for a long time without replacing the battery, an amount of power consumed for making the activating circuit active all the times cannot be ignored.

The sensor communication module 15 according to the present invention includes an intermittent activation control circuit 194 (194a to 194d), instead of the activating circuit.

Figure 4:
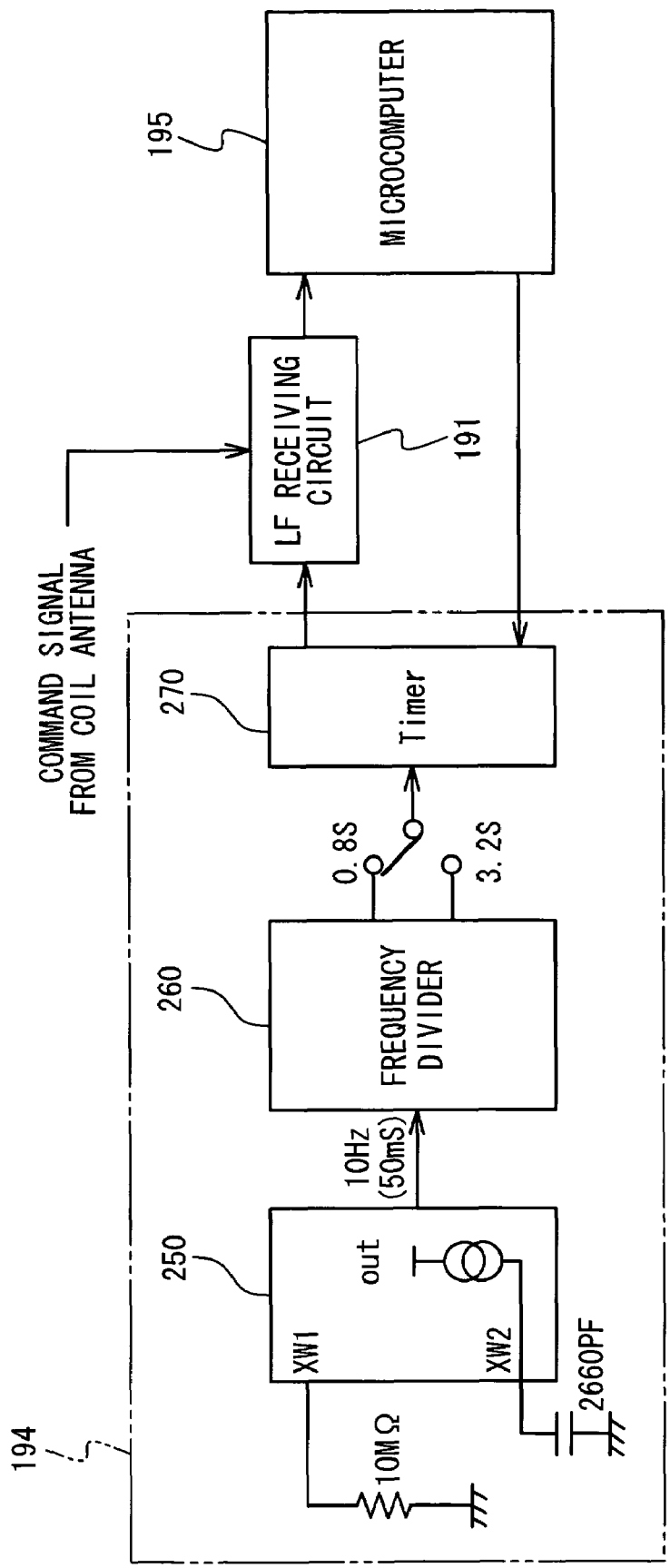
FIG. 4 is a block diagram showing an outline of the configuration of an intermittent activation control circuit in the sensor communication module according to the embodiment of the present invention.

FIG. 4 shows the intermittent activation control circuit 194 according to this embodiment. The intermittent activation control circuit 194 is provided with an oscillator 250 (250a to 250d), a frequency divider 260 (260a to 260d), a switch 262 (262a to 262d) and a timer 270 (270a to 270d).

Operations of the intermittent activation control circuit 194 according to this embodiment and of the sensor communication module 15 provided with the intermittent activating circuits 194 will be described below. The oscillator 250 provided in the intermittent activation control circuit 194 according to this embodiment generates an oscillation signal with the frequency of 10 Hz, i.e., pulses of 50 mS (milliseconds) in the duty of 50%. The oscillation signal is outputted from the oscillator 250 and frequency-divided by the frequency divider 260 connected to the oscillator 250, and then supplied to the timer 270 through the switch 262 for selection of a division ratio. The timer 270 adjusts an activation period so as for the 50-mS wide pulse to be outputted from the intermittent activation control circuit 194 in a predetermined activation period. The microcomputer 195 sends a control signal to the timer 270 such that the activation period is set to any value in a range 0.8 S (seconds) to 204.8 S in step of 0.8 S. At this time, the switch 262 is controlled by the timer 270 such that the oscillation signal is outputted to the timer 270 in the period of 0.8 S or 3.2 S. The intermittent activation control circuit 194 outputs the 50-mS wide pulses as the activation signal to the LF receiving circuit 191. It should be noted that the timer 270 is set to a default value in the initial setting and the setting value can be changed by the microcomputer 195. However, the setting value may be unchangeable.

FIG. 5A shows a timing chart for the activation signal outputted from the intermittent activation control circuits 194 to the LF receiving circuit 191. Also, FIG. 5B shows a timing chart for the command data signal transmitted from the communication control module 22 to the sensor communication module 15. In FIG. 5A, as one example, the intermittent activating circuit 194 according to this embodiment outputs the activation signal with the activation period of 3.2 S to the LF receiving circuit 191. At this time, it is assumed that the communication control module 22 transmits to the sensor communication modules 15a to 15d the LF electromagnetic wave of the command data signal with the period of 6.4 S and the duty of 50%, as shown in FIG. 5B. In this case, even if the communication control module 22 transmits the command data signal to the sensor communication modules 15a to 15d at any timing, the command data signal can be received by the LF receiving circuits 191a to 191d concurrently with reception of the activation signals of 50 mS wide pulses transmitted from the intermittent activation control circuits 194a to 194d. Under this condition, the LF receiving circuit 191 is ready to receive the command data signal from the communication control module 22 in response to the activation signal. Upon reception of the command data signal, the LF receiving circuit 191 sends an interrupt signal to the microcomputer 195 to activate it.

When the command data signal is transmitted from the communication control module 22 to the sensor communication modules 15a to 15d, it is necessary that the LF receiving circuits 191 are activated through reception of the activation signals from the intermittent activation control circuits 194. That is, when the period of the activation signal is set to 3.2 S, the period of the command data signal needs to be 6.4 S or more in case of the duty of 50%. This relationship applies to not only a case where the period of the activation signal is set to 3.2 S but also all cases where the period of the activation signal is set within a range of 0.8 S to 204.8 S.

In the sensor communication module 15 provided with the intermittent activation control circuit 194 according to this embodiment, it is the most important to minimize power consumption. Thus, it is desired to reduce power consumption as far as possible by elongating the period of the activation signal outputted from the intermittent activation control circuit 194. In this case, in order to make the period of the activation signal longer so that the LF electromagnetic wave of command data signal transmitted from the communication control module 22 can be received at all times, it is necessary to elongate the period of command data signal transmitted from the communication control module 22. However, in this case, problems would be caused that the power consumption in the communication control module 22 is limited, and the transmission rate of command data signal becomes low. Therefore, the period of the activation signal is finally determined in consideration of the desired power consumptions in the sensor communication modules 15 and the communication control module 22, and the transmission speed of command data signal.

In the transmission module 15 of the this embodiment, an activation signal period control program is stored in the ROM 198 provided in the microcomputer 195. The clock activation signal period program is executed by the CPU 197 in response to the command data signal from the communication control module 22. When command data signal is for setting the clock interval (period), the setting value of the clock interval (period) of the timer 270 can be adjusted for the next command data signal based on the clock activation signal period program. Thus, it is possible to adjust the power consumption in the sensor communication module 15 for every reception of the command data signal. In conjunction with that, it is possible to adjust the power consumption in the communication control module 22 and the transmission speed of command data signal.

FIG. 6 shows a relationship between the period of the activation signal outputted from the intermittent activation control circuit 194 and the actual reception mean current (/hr) in the LF receiving circuit 191, when the consumption current in the LF receiving circuits 191 provided in the sensor communication module 15 according to this embodiment is 4 (μA/hr).

The discharge capacity of an ordinary (button) battery 180 is approximately 220 mA*hr. If the LF receiving circuit 191 consumes the current of 4 μA/hr at all times, the battery 180 become exhausted in about 6.3 years.

In the sensor communication module 15 according to this embodiment, the minimum usable years are set to about 10. As shown in FIG. 6, if the period of the activation signal is set to 0.8 seconds, the current consumption in the LF receiving circuits 191 is 4 (μA/hr)/(0.8 S/50 mS)=4/16=250 (nA/hr). Accordingly, in case that only the LF receiving circuit 191 consumes current, the lifetime of the battery 180 is 100 years which is 16 times longer than the above mentioned case. In actual, however, the current to be consumed in the sensor communication module 15 according to this embodiment must include not only the current consumption in the LF receiving circuits 191 but also the current flowing in the microcomputer 195 and the transmission interface 210 and even the stationary current consumption in the intermittent activation control circuits 194. When the sensor communication module 15 transmits the RF electromagnetic wave of the measurement data signals through the transmission interface 210 to the communication control module 22 once every 10 minutes, the ratio of their current consumption is 1:1:1 in the LF receiving circuit 191, the microcomputer 195 and the transmission interface 210, and intermittent activation control circuit 194. Therefore, the above-mentioned lifetime of the battery 180 in the sensor communication module 15 according to this embodiment becomes about 30 years in case of the activation signal period of 0.8 s. Thus, 10 years or more can be achieved as an initial target of the lifetime of the battery 180 in the sensor communication module 15 according to this embodiment.

In the sensor communication module 15 of this embodiment, the intermittent activation control circuit 194 is controlled to output the activation signal in the predetermined period, thereby realizing data communication by the sensor communication module 15 in extremely low power consumption. Thus, it is possible to carry out data communications by the sensor communication module 15 without replacing the battery 180 for a long period of time.

In the sensor communication module 15 according to this embodiment, the setting value of the clock interval (period) of the activation signal set in the timer 270 provided in the intermittent activation control circuit 194 is controlled based on the command data signal so that the clock interval for the activation signal is changed based on the clock interval (period) of the command data signal. Thus, it is possible to change the power consumption in the sensor communication module 15 as required. In conjunction with that, it is also possible to adjust the balance between the power consumption in the communication control module 22 and the power consumption in the sensor communication module 15. Moreover, it is possible to change the transmission speed of the command data signal based on the clock interval for the activating signal.

The present invention is mainly addressed to TPMS related to the tires attached to automobile. As a matter of course, the present invention is not limited to automobile, and can be applied to TPMS in other moving systems with tires.

In addition, it is needless to say that the data communication method according to the present invention is applicable to general ASK-mode data communication, as a more power-saving communication scheme.

What is claimed is:

1. A data communication device comprising:
   a receiving circuit configured to receive a data signal in an active state;
   an intermittent activation control circuit configured to activate said receiving circuit into the active state in a predetermined time interval; and
   a control unit configured to operate in response to said data signal received by said receiving circuit,
   wherein said control unit controls said time interval of said intermittent activation control circuit based on a command of said data signal received by said receiving circuit, and
   wherein said command is determined based on a time length of a next one of said data signal.

2. A data communication device comprising:
   a receiving circuit configured to receive a data signal in an active state;
   an intermittent activation control circuit configured to activate said receiving circuit into the active state in a predetermined time interval; and
   a control unit configured to operate in response to said data signal received by said receiving circuit,
   wherein said receiving circuit is set to the active state in response to an activation signal, and
   said intermittent activation control circuit comprises:
   an oscillator configured to generate an oscillation signal;
   a frequency divider configured to frequency-divide the oscillation signal; and
   a timer configured to output the oscillation signal after the frequency-division as the activation signal to said receiving circuit in said time interval based on a time interval data.

3. The data communication device according to claim 2, wherein said frequency divider has a plurality of frequency division ratios, and
   said intermittent activation control circuit further comprises:
   a switch provided between said frequency divider and said timer to select one of said plurality of frequency division ratios based on said time interval data.

4. A communication control module provided for a target, comprising:
   first and second antennas;
   a receiving circuit configured to receive a command data signal through said first antenna in an active state;
   an intermittent activation control circuit configured to activate said receiving circuit into the active state in a predetermined time interval;
   a sensor section including at least a sensor for said target;
   a transmission interface configured to transmit a measurement data signal through said second antenna; and
   a control unit configured to control said sensor section and said transmission interface such that said measurement data signal from said sensor section is transmitted, when said command data signal received by said receiving circuit includes a measurement command.

5. The communication control module according to claim 4, wherein said control unit controls said time interval of said intermittent activation control circuit based on said command data signal received by said receiving circuit, when said command data signal received by said receiving circuit includes an interval setting command.

6. The communication control module according to claim 5, wherein said command is determined based on a time length of a next one of said data signal.

7. The data communication device according to claim 5, wherein said receiving circuit is set to the active state in response to an activation signal, and
said intermittent activation control circuit comprises:
an oscillator configured to generate an oscillation signal;
a frequency divider configured to frequency-divide the oscillation signal; and
a timer configured to output the oscillation signal after the frequency-division as the activation signal to said receiving circuit in said time interval based on a time interval data outputted from said control circuit in response to said command data signal.

8. The communication control module according to claim 7, wherein said frequency divider has a plurality of frequency division ratios, and
said intermittent activation control circuit further comprises:
a switch provided between said frequency divider and said timer to select one of said plurality of frequency division ratios based on said time interval data.

9. The communication control module according to claim 4, wherein a duration time of said command data signal is equal to or longer than said time interval.

10. A TPMS (tire pneumatic pressure monitoring system) comprising:
a plurality of sensor communication modules provided for tires, each of plurality of sensor communication modules having first and second antennas;
a plurality of sensor initiators provided or said tires, each of said plurality of sensor initiators having third and fourth antennas; and
a communication control module provided for a car body, and connected with said third and fourth antennas through a LAN,
wherein said communication control module transmits an electromagnetic wave of a command data signal through said third antenna to each of said plurality of sensor communication modules, and
each of said plurality of sensor communication modules intermittently receives said command data signal through said first antenna, and transmits a measurement data signal of at least one of a tire pneumatic pressure and a tire temperature to said communication control module from said second antenna through said fourth antenna when said command data signal includes a measurement command.

11. The TPMS according to claim 10, wherein each of said plurality of sensor communication modules comprises:
a receiving circuit configured to receive said command data signal through said first antenna in an active state;
an intermittent activation control circuit configured to activate said receiving circuit into the active state in a predetermined time interval;
a sensor section including at least one of a sensor for the tire pneumatic pressure and a sensor for the tire temperature;
a transmission interface configured to transmit said measurement data signal obtained from said sensor section through said second antenna; and
a control unit configured to control said sensor section and said transmission interface such that said measurement data signal from said sensor section is transmitted, when said command data signal received by said receiving circuit includes said measurement command.

12. The TPMS according to claim 11, wherein said control unit controls said time interval of said intermittent activation control circuit based on said command data signal received by said receiving circuit, when said command data signal includes an interval setting command.

13. The TPMS according to claim 12, wherein said command is determined based on a time length of a next one of said data signal.

14. An operation method in a TPMS (tire pneumatic pressure monitoring system), comprising:
transmitting a communication control module an electromagnetic wave of a command data signal through a first antenna to each of a plurality of sensor communication modules provided for tires;
intermittently receiving said command data signal through a second antenna provided for each of said plurality of sensor communication modules; and
transmitting a measurement data signal of at least one of a tire pneumatic pressure and a tire temperature to said communication control module from a third antenna though a fourth antenna when said command data signal includes a measurement command.

15. The operation method according to claim 14, wherein said intermittently receiving comprises:
intermittently activating a receiving circuit into an active state in a predetermined time interval; and
receiving said command data signal through said first antenna in the active state of said receiving circuit.

16. The operation method according to claim 14, wherein said transmitting a measurement data signal comprises:
sensing at least one of the tire pneumatic pressure and the tire temperature; and
transmitting said measurement data signal as a result of said sensing to said communication control module from said third antenna through said fourth antenna when said command data signal includes the measurement command.

17. The operation method according to claim 14, further comprising:
controlling said time interval based on said command data signal received by said receiving circuit, when said command data signal includes an interval setting command.

* * * * *